Figures 1, 2:
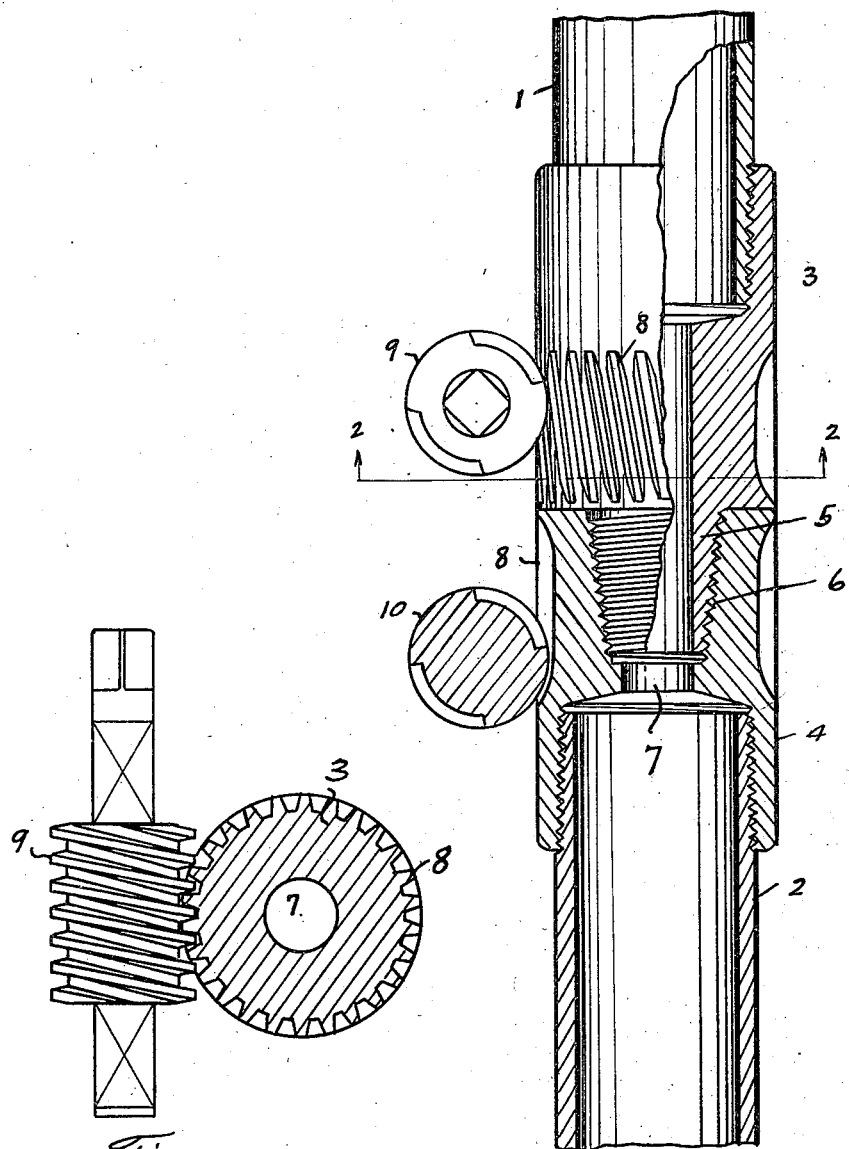

Nov. 19, 1929.  C. D. BENNETT  1,735,991
TOOL JOINT
Filed April 1, 1926

INVENTOR
Clarence D. Bennett
BY
Hardway & Cathey
ATTORNEYS

Patented Nov. 19, 1929

1,735,991

UNITED STATES PATENT OFFICE

CLARENCE D. BENNETT, OF MERTENS, TEXAS

TOOL JOINT

Application filed April 1, 1926. Serial No. 99,125.

This invention relates to new and useful improvements in a tool joint.

One object of the invention is to provide a tool joint specially adapted for use in connecting together sections of pipe or drill stem.

Another object of the invention is to provide a tool joint comprising two joint members, one having a tapering externally threaded pin and the other having a tapering internally threaded box adapted to receive said pin, one or both of said joint members having external gear teeth for connection with a turning apparatus by means of which the joint members may be screwed together or separated. The invention also comprehends, the combination with a tool joint, of an apparatus for screwing said joints together or separating them.

With the above and other objects in view this invention has particular relation to certain novel features of construction, operation and arrangement of parts, an example of which is given in this specification and illustrated in the accompanying drawings, wherein:—

Figure 1 shows a side elevation partly in section of a tool joint embodying said invention, and Figure 2 shows a cross-sectional view, taken on the line 2—2 of Figure 1.

Referring now more particularly to the drawings, wherein like numerals of reference designate similar parts in each of the figures the numerals 1 and 2 designate the upper and lower sections, respectively, of a string of pipe, or drill stem. The adjacent ends of these sections are threaded into the respective tool joint members 3 and 4. The lower end of the joint member 3 has a tapering externally threaded pin 5 and the adjacent end of the member 4 has a tapering internally threaded box 6, adapted to receive said pin.

The tool joint has a central water course 7 extending therethrough.

The external surface of each joint member has gear teeth, as 8 thereon. These gear teeth are preferably of the worm gear type.

A suitable turning apparatus has been provided embodying the worm gears 9 and 10, the former being in mesh with the teeth 8 of the upper joint member 3 and the latter being in mesh with the teeth of the lower joint member 4. In operation these gears 9 and 10 may be turned in opposite directions to quickly unscrew the pin from the box, or to screw the pin into the box; or one of said gears 9, 10 may be held stationary and the other turned to accomplish said purpose. It is possible, however, to provide only one of said joint members with external gear teeth 8 and apply the driving gear 9 or 10 thereto and hold the other joint member against turning by a tong or other similar implement.

The gears 9, 10 of the turning apparatus may be either hand driven, or power driven, as desired.

What I claim is:—

1. In a tool joint comprising two joint members one having an externally threaded pin and the other having an internally threaded box adapted to receive said pin, both of said members having external gear teeth; a turning apparatus embodying driving gears in mesh with the teeth of said respective members said teeth being formed to permit said members to move toward and from each other while remaining in mesh with said driving gears.

2. A turning apparatus adapted to engage and relatively turn externally geared tool joint members having threaded connections, said apparatus embodying driving gears adapted to intermesh with the geared tool joint members, formed to permit the movement of the joint members toward and from each other while in mesh with said teeth.

In testimony whereof I have signed my name to this specification.

CLARENCE D. BENNETT.